(12) United States Patent
Spirkl

(10) Patent No.: US 7,299,447 B2
(45) Date of Patent: Nov. 20, 2007

(54) METHOD OF TESTING A MAPPING OF AN ELECTRICAL CIRCUIT

(75) Inventor: Wolfgang Spirkl, Germering (DE)

(73) Assignee: Infineon Technologies AG, Munich (DE)

( * ) Notice: Subject to any disclaimer, the term of this patent is extended or adjusted under 35 U.S.C. 154(b) by 683 days.

(21) Appl. No.: 10/238,819

(22) Filed: Sep. 10, 2002

(65) Prior Publication Data

US 2003/0061582 A1 Mar. 27, 2003

(30) Foreign Application Priority Data

Sep. 10, 2001 (DE) ................................ 101 44 455

(51) Int. Cl.
*G06F 9/44* (2006.01)
*G06F 17/50* (2006.01)
*G06F 9/45* (2006.01)
*G06F 19/00* (2006.01)

(52) U.S. Cl. ..................... 717/112; 703/14; 703/22; 703/15; 703/16; 714/738; 702/117; 716/4

(58) Field of Classification Search ................ 703/14, 703/15–16; 717/112; 714/738; 702/117; 716/4

See application file for complete search history.

(56) References Cited

U.S. PATENT DOCUMENTS

| | | | | |
|---|---|---|---|---|
| 4,204,633 A | * | 5/1980 | Goel | 714/738 |
| 4,503,536 A | * | 3/1985 | Panzer | 714/732 |
| 5,410,552 A | * | 4/1995 | Hosokawa | 714/738 |
| 5,539,652 A | * | 7/1996 | Tegethoff | 703/14 |
| 5,650,938 A | * | 7/1997 | Bootehsaz et al. | 716/6 |
| 6,292,765 B1 | * | 9/2001 | Ho et al. | 703/14 |
| 6,363,509 B1 | * | 3/2002 | Parulkar et al. | 714/738 |
| 6,631,344 B1 | * | 10/2003 | Kapur et al. | 703/22 |

FOREIGN PATENT DOCUMENTS

| | | |
|---|---|---|
| DE | 196 22 041 A1 | 12/1997 |
| DE | 199 42 981 A1 | 3/2001 |
| EP | 1 085 415 A2 | 3/2001 |

OTHER PUBLICATIONS

Carreira et al. 'Xception: A Technique for the Experimental Evaluation of Dependability in Modern Computers' IEEE Transactions on Software Engineering, vol. 24 No. 2 Feb. 1998.*

(Continued)

*Primary Examiner*—Kamini Shah
*Assistant Examiner*—Shambhavi Patel
(74) *Attorney, Agent, or Firm*—Laurence A. Greenberg; Werner H. Stemer; Ralph E. Locher

(57) ABSTRACT

An electrical circuit can be described with a reference model that has a plurality of states and a plurality of state transitions. Acceptable and/or unacceptable instruction sets are predefined for each state. Acceptable and unacceptable instruction sets are generated randomly in succession from the reference model and applied to a mapping of the electrical circuit for processing. By comparing the instruction sets processed by the mapping of the electrical circuit with the instruction sets determined from the reference model, conclusive information relating to the mapping of the electrical circuit is obtained.

16 Claims, 4 Drawing Sheets

OTHER PUBLICATIONS

Moundanos et al. 'On Design Validation Using Verification Technology'. Journal of Electronic Testing: Theory and Applications 1999.*

Schuler et al. 'An Efficient Method of Fault Simulation for Digital Circuits Modeled From Boolean Gates and Memories'. 1977.*

Hayes, J. P.: "Detection of Pattern-Sensitive Faults in Random-Access Memories", IEEE, vol. C-24, No. 2, Feb. 1975, pp. 150-157.

Cheng, K.-T. et al.: "A Functional Fault Model for Sequential Machines", IEEE, vol. 11, No. 9, Sep. 1992, pp. 1065-1073.

Spaanenburg, L.: "Structured Design of Control Specifications", Elsevier Science Publishers B.V., 1986, pp. 53-92.

Ergaänzende Kapitel zu I.N. Bronstein , K.A. Semendjajew , "Taschenbuch der Mathematik," Verlag Harri Deutsch, Thun und Frankfurt/ Main, 1986, ISBN 3-87 144-493-6, pp. 201-202, pocketbook of mathematics.

* cited by examiner

FIG. 1

| Binary | Instruction | Abbreviation |
|---|---|---|
| 000a | Activate | ACT(a) |
| 001X | Read | RD |
| 010d | Write | WRI(d) |
| 011X | Deactivate (Precharge) | PRE |
| 100X | No Operation | NOP |
| 101X | Not Acceptable | - |
| 110X | Not Acceptable | - |
| 111X | Not Acceptable | - |

1

| Time | Input Vector | Output Data Item | Notes |
|---|---|---|---|
| 01 | ACT(0) | X | Open Word Line 0 |
| 02 | WRI(0) | X | Write Input Data Item 0 |
| 03 | PRE | X | Close Word Line 0 |
| 04 | ACT(0) | X | Open Word Line 1 |
| 05 | WRI(0) | X | Write Input Data Item 0 |
| 06 | PRE | X | Close Word Line 1 |
| 07 | ACT(0) | X | Open Word Line 0 |
| 08 | WRI(0) | X | Write Input Data Item 0 |
| 09 | NOP | X | |
| 10 | RD | X | Read Output Data Item 0, appears in the next time step as output |
| 11 | WRI(1) | 0 | Write Input Data Item 1, Test Read Data Item 0 |
| 12 | PRE | X | Close Word Line 0 |
| 13 | ACT(1) | X | Open Word Line 1 |
| 14 | ACT(0) | X | Unacceptable |

FIG. 4

METHOD OF TESTING A MAPPING OF AN ELECTRICAL CIRCUIT

BACKGROUND OF THE INVENTION

Field of the Invention

The invention relates to a method for testing a diagram, present on a computer system, of an electrical circuit which can be actuated with instruction sets.

Electrical components, in particular chips, embedded DRAM cores forming part of an ASIC chip, i.e., of an Application Specific Integrated Circuit chip, are usually supplied to the customer together with a printed specification and frequently with a specification which can be executed. The customer connects such electrical components to other electrical components for the purpose of producing electrical circuits with specific functionalities.

Basic data, for example the temperature range and voltage range, which cannot be directly included in automated process sequences are found in the printed specification of supplied electrical components. In order to obtain a precise description of the acceptable input sequences and of the characteristics of the output data of the supplied electrical components, the customer is frequently provided with an executable specification.

This executable specification generally constitutes a simulation model which indicates to the customer the reaction of the electrical components to applied input data so that the customer can familiarize himself with the characteristics of the component even before the component is used.

The executable specification is frequently provided as a diagram (a schematic diagram, a map, a mapping) of the electrical circuit on a computer system in the form of a simulation program for execution on a computer system. The executable specification rejects unacceptable input sequences of the electrical component. In this way, the customer is able to correct the input sequences or the programming and the design of the other electrical components early in the development process.

For example, embedded DRAM cores have a relatively complex instruction structure. Processors which are connected to such embedded DRAM cores use automatically generated instructions which generate input sequences which cannot be predicted. Here, instruction sequences which are unacceptable for the embedded DRAM cores frequently occur. If the executable specification of the respective embedded DRAM core then permits one or more unacceptable input sequences, this can lead to an electrical circuit being implemented by the customer in such a way that it uses these unacceptable input sequences. In this case, the occurrence of faults is not noticed until the first prototypes are used.

Such faults are virtually impossible to detect by analyzing the individual components. As there is generally no accessible interface with the customer logic, such failures are particularly difficult to analyze. Furthermore, the occurrence of such faults leads to large amounts of time being lost in the development phase, and additionally entails high costs.

In the prior art, methods are known with which the correct execution of acceptable input sequences can be checked exclusively by means of the executable specification of electrical components. In many cases, it would be decisive to ensure that all the unacceptable input sequences are reliably detected by the executable specification. No formal method is known for this in the prior art.

SUMMARY OF THE INVENTION

It is accordingly an object of the invention to provide a method of testing a diagram of an electric circuit, which overcomes the above-mentioned disadvantages of the heretofore-known devices and methods of this general type and which enables the detection of all the unacceptable input sequences of an electrical component quickly and reliably by the executable specification.

With the foregoing and other objects in view there is provided, in accordance with the invention, a method of testing a mapping, present on a computer system, of an electrical circuit that is actuatable with instruction sets, and wherein:

the electrical circuit has a closed instruction space and a plurality of memory cells, and the circuit is described by a reference model having a plurality of states and a plurality of state transitions;

at least one of an acceptable instruction set for each state and an unacceptable instruction set for each state is predefined, an instruction set having an input vector and an output data item, whereby for each input vector of an instruction set there is reached, starting from a respectively present state, a subsequent state and an output data item is generated;

the mapping of the electrical circuit is configured, upon an acceptable instruction set, to allow a state transition into a subsequent state of the mapping and to output the generated output data item, and, upon an unacceptable instruction set, to issue a fault message; and instruction sets are generated with specific probabilities and applied to the mapping of the electrical circuit.

The method according to the invention comprises the following steps:

a) initializing the mapping of the electrical circuit to be tested;

b) selecting a region of the mapping of the electrical circuit to be tested;

c) writing initial data into the mappings of the memory cells of the region selected in step b);

d) generating a sequence of acceptable instruction sets using the reference model;

e) applying the instruction sets generated in step d) to the region of the mapping selected in step b);

f) generating an unacceptable instruction set using the reference model;

g) applying the unacceptable instruction set to the region of the mapping selected in step b);

h) checking whether the mapping of the electrical circuit supplies a fault message;

i) repeating steps f) to h) for further unacceptable instruction sets;

j) repeating steps c) to i) until sufficient precision of the testing is achieved; and k) repeating steps b) to j) for further regions of the mapping of the electrical circuit to be tested.

In other words, according to one requirement of the invention, a mapping of an electrical circuit is present on a computer system. This mapping is configured as a simulation model or as an executable specification. The basic electrical circuit can be actuated with instruction sets and has a plurality of memory cells.

According to one further requirement of the invention, the electrical circuit can be described by means of a reference model. This reference model has a plurality of states and a plurality of state transitions. Here, one or more acceptable instruction sets and/or one or more unacceptable instruction sets are predefined for each state. All the instruction sets are contained in a closed instruction space of the electrical circuit. Each instruction set has, in each case, an input vector and an output data item. Precisely one subsequent state can be reached for each input vector starting from a given state of the reference model. Furthermore, an output data item is generated as a function of the respectively present state, and the input vector.

The mapping of the electrical circuit determines, for each acceptable instruction set, a subsequent state and corresponding output data. When there is an unacceptable instruction set which is detected from the mapping of the electrical circuit, a fault message is output together with the respective input vector and the respective generated output data item.

Instruction sets are randomly generated in the method according to the invention, it being possible to assign specific probabilities to individual instruction sets of the instruction space of the electrical circuit. The instruction sets which are generated are applied to the mapping of the electrical circuit and processed there as described.

In the first step of the method according to the invention, the mapping of the electrical circuit to be tested is initialized. Here, the state variables of the mapping of the electrical circuit to be tested are applied to a respective well-defined state. The system state of the electrical circuit is set to an initial value in the mapping. Here, all the memory cells are marked as invalid and the system state is set to the value "Idle" or "Inactive".

Then, a region of the mapping of the electrical circuit to be tested is selected. Here, in particular a specific quantity of memory addresses is selected. This region selection can also be dispensed with for small electrical circuits to be tested. In this case, the mapping of the entire electrical circuit is subject to testing with the method according to the invention.

In the next step, initial data are written into the mappings of these memory cells. These data are generally generated randomly.

In the next step, a sequence of acceptable instruction sets is generated. An exemplary sequence of acceptable instruction sets comprises 1000 individual instruction sets. The acceptability of the instruction sets is determined by means of the reference model. The selected region of the mapping of the electrical circuit is conditioned with the instruction sets which are generated in this way.

Then, an unacceptable instruction set is added to this sequence of acceptable instruction sets. The unacceptability of the added instruction set is determined by means of the reference model. The mapping of the electrical circuit is then conditioned with the unacceptable instruction set generated in this way. Testing is carried out to determine whether the mapping of the electrical circuit supplies a clear fault message.

The steps for the generation of an unacceptable instruction set and the application of this unacceptable instruction set to the mapping of the electrical circuit as well as the checking for the presence of a clear fault message are then repeated. The number of repetitions of these steps can be predefined by a user. It is also possible to dispense with the repetition of these steps if a user checks to determine whether precisely one unacceptable instruction set which occurs after a sequence of acceptable instruction sets gives rise to a fault message of the mapping of the electrical circuit.

In a further step of the method, the method steps are repeated starting from the writing of initial data into the mappings of the memory cells. These steps are repeated until a sufficient level of precision of the testing of the mapping of the electrical circuit is achieved. This can be defined by a user.

According to the last method step, the method steps are repeated starting from the selection of a region of the mapping of the electrical circuit to be tested. In this way, further regions of the mapping of the electrical circuit can be used for testing. This repetition is dispensed with if the mapping of the electrical circuit to be tested is made so small that the entire mapping of the electrical circuit can be checked in one pass.

A basic idea of the invention is to simulate, selectively with unacceptable instruction sets, an executable specification which is present as a mapping of an electrical circuit and is to be checked. As a result it is possible to check how well unacceptable instruction sets are uncovered by the executable specification.

According to a further basic idea of the invention, random-based instruction sets for testing the executable specification of an electrical circuit are generated using a reference model, and the formal equivalence between the executable specification and the reference model is checked. Here, firstly a sequence of acceptable instruction sets is created. Then, an unacceptable instruction set is selectively created and testing is performed to determine whether the executable specification detects the unacceptable instruction set. This method can be repeated as often as desired.

In a delimitation of tests which have been developed manually, the invention provides a possible way of formally handling the analysis of the design and the structure of electrical circuits with random test patterns. Here, complete fault detection and test coverage are achieved asymptotically.

By using instruction sets which are generated randomly and are based on the reference model it is possible to generate a set of input data which is complete with respect to the executable specification. This is possible without having to accept the very long development time of manually developed test patterns.

The invention provides a possible way for the customer to uncover unacceptable actuation operations and unexpected faults in the actuation of the executable specification. Furthermore, there is excellent re-usability of the method according to the invention for a multiplicity of types of electrical circuits. The number of personnel which need to be deployed to develop tests of such executable specifications can be reduced and expensive delays in the development phase as well as expensive redesigns of masks for manufacturing electrical circuits can be avoided.

According to one embodiment of the invention, after the step of conditioning the selected region of the mapping of the electrical circuit with the acceptable instruction sets generated, checking is carried out to determine whether the mapping of the electrical circuit rejects a formally acceptable instruction set as unacceptable at any time, and there is further checking to determine whether the mapping of the electrical circuit supplies the same output data as is expected by the reference model.

This embodiment of the invention makes it advantageously possible to check a mapping of an electrical circuit to determine whether acceptable instruction sets are assumed and processed correctly.

According to a further embodiment of the invention, the current input vector and the current output data item are output with a fault message, preferably on a screen of a computer system, if the checking of the input vectors of the acceptable instruction sets is rejected by the mapping of the electrical circuit, if the output data supplied by the mapping of the electrical circuit differs from the output data of the acceptable instruction sets generated by means of the reference model, and if the mapping of the electrical circuit does not supply any fault message when unacceptable instruction sets are created. The method according to the invention stops after this fault message has been output.

This embodiment of the invention ensures that each individual fault is determined reliably and almost simultaneously.

The method can also be provided in such a way that after a fault of a mapping of the electrical circuit has been determined, a fault message is issued and the method according to the invention is continued.

It is advantageous here that all the faults of the mapping of the electrical circuit are represented in combination to form a number of randomly generated instruction sets, and can be tracked.

According to one further embodiment of the invention, the mapping of the electrical circuit has a time profile with equidistant, discrete time steps. At each time step, in each case an input vector is applied to the mapping of the electrical circuit. The associated output data item and the subsequent state are determined from the respectively present state using the data of the respective input vector. The output data item which is determined in this way and the subsequent state are present in the respective next time step of the mapping of the electrical circuit.

This embodiment of the invention provides a projection of an electrical circuit onto its mapping which is true to the original.

According to a further embodiment of the invention, each input vector is divided either into precisely one instruction from the closed instruction space or into precisely one instruction composed of and in an input value. In this case, the instructions from the closed instruction space and/or the input values can be generated with specific probabilities and applied to the mapping of the electrical circuit. This configuration of the input vector of the mapping of the electrical circuit provides a simple way of actuating the mapping of the electrical circuit which is true to the original.

According to a further embodiment of the invention, each output data item has precisely one output value or precisely one variable which indicates that there is no output value available for the respectively present instruction set. This embodiment of the invention provides a transparent possibility of tracking the method of operation of the mapping of the electrical circuit.

According to a further embodiment of the invention, a generator, in particular a random-number-based computer program, is provided which generates the instruction sets, in particular the input vectors of the mapping of the electrical circuit. This computer program may be embodied, in particular, as part of the method, also present as a computer program, for testing a mapping of an electrical circuit.

This embodiment of the invention provides asymptotically complete test coverage. As a sequence of instruction sets grows, all the combinations and all the sequences of all the conceivable instruction sets are generated and used to test the mapping of the electrical circuit.

The invention is also implemented in a computer program for executing a method for testing a mapping, present on a computer system, of an electrical circuit which can be actuated with instruction sets.

The computer program is configured here in such a way that after the inputting of the data necessary to produce the mapping of the electrical circuit to be tested, a method according to the invention can be carried out in an embodiment described above. Here, as a result of the method, it is possible to make a statement as to whether and how well unacceptable instruction sets are detected by the mapping of the electrical circuit. If the mapping of the electrical circuit has faults during the execution of the test method, a fault message is issued and the corresponding instruction sets are output. By means of the method implemented on the computer program it is possible to check the mapping of an electrical circuit particularly advantageously.

The improved computer program according to the invention provides improved test coverage, simple and effective detection of faults and improvement of running time in comparison with the known methods for testing mappings of an electrical circuit.

The invention also relates to a computer program which is contained on a storage medium, which is stored in a computer memory, which is contained in a direct access memory or which is transmitted on an electrical carrier signal.

Furthermore, the invention relates to a data carrier with such a computer program, and to a method wherein such a computer program is downloaded from an electrical data network, for example from the Internet, onto a computer which is connected to the data network.

In methods for testing mappings of an electrical circuit, the relevant requirements are that the respective mapping accepts all the acceptable data records, that the mapping supplies correct output data for all the acceptable data records, and that the mapping rejects all the unacceptable data records.

The method according to the invention fulfills all these requirements. In particular, the requirement to reject unacceptable data records is also executed in the method according to the invention.

Other features which are considered as characteristic for the invention are set forth in the appended claims.

Although the invention is illustrated and described herein as embodied in a method for testing a mapping of an electrical circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a table of a memory cell instruction space (1) of a mapping of a memory module according to an exemplary embodiment;

FIG. 4 is a memory cell test pattern (6), generated according to the flowchart of FIG. 3, of the mapping of the memory module which has the memory cell instruction space 1 shown in FIG. 1 and the memory cell state model (2) shown in FIG. 2, in accordance with an exemplary embodiment.

DESCRIPTION OF THE PREFERRED EMBODIMENTS

Figure 2:
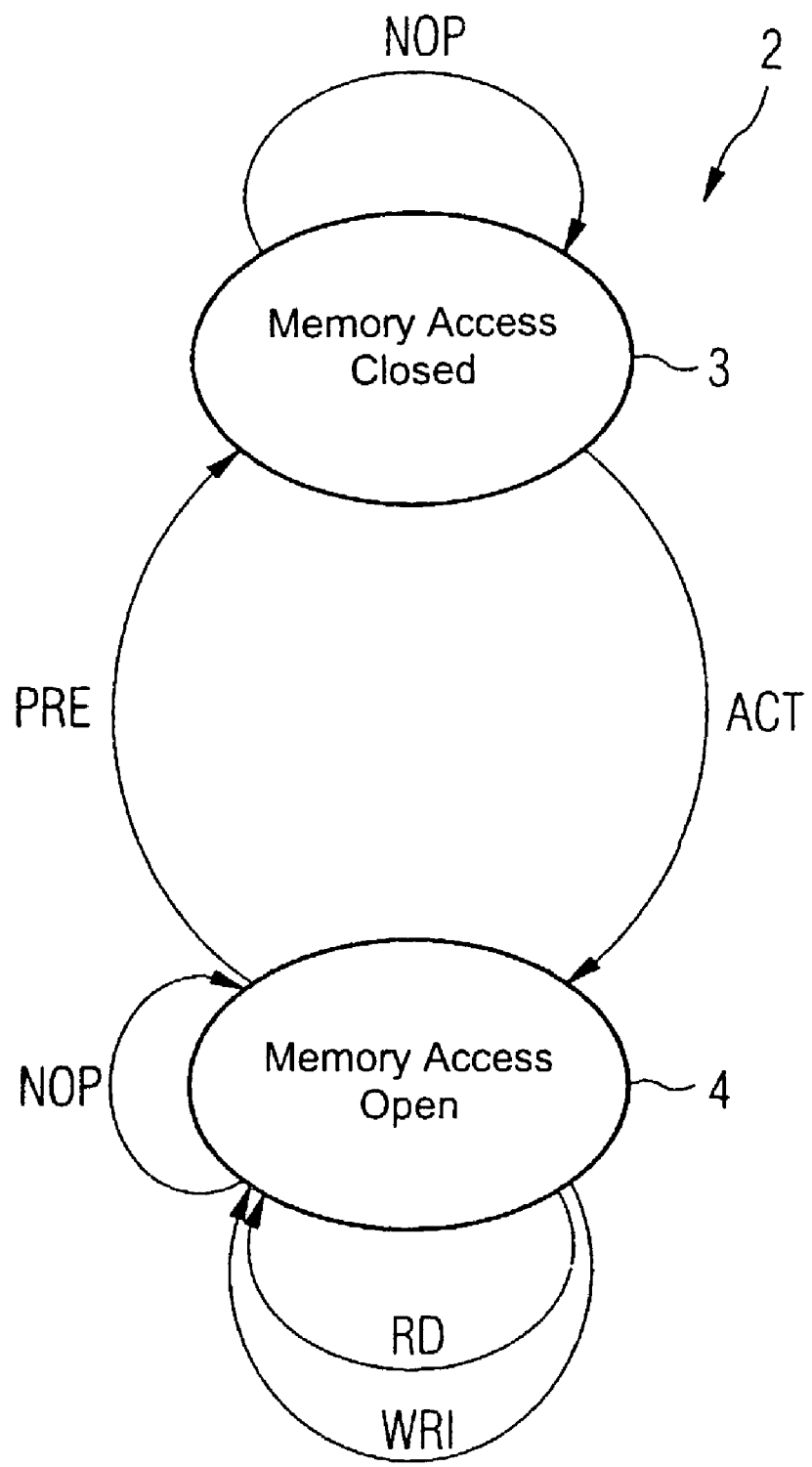
FIG. 2 is a memory cell state model (2) of the mapping of the memory module which has the memory cell instruction space shown in FIG. 1, with a memory access closed state (3) and with a memory access open state (4), in accordance with an exemplary embodiment.

Referring now to the figures of the drawing in detail and first, particularly, to FIG. 1 thereof, there is shown a memory cell instruction space 1 of a mapping of a memory module according to an exemplary embodiment.

In the exemplary embodiment, a mapping of a memory module having two memory cells is considered as a simplified mapping of an electrical circuit. These two memory cells are capable of storing the binary data zero or one for an unlimited time.

In order to actuate these two memory cells, the memory cell instruction space 1 shown in FIG. 1 is available. All the acceptable instructions for actuating the two memory cells of the memory module are combined in this memory cell instruction space 1. The instructions "Activate", "Read", "Write", "Deactivate" and "No Operation" shown in FIG. 1 are available for the instructions for actuating the memory module by analogy with the typical DRAM functionality (DRAM, dynamic random access memory).

The instructions are $2^3=8$ bit-coded, this coding being capable of being implemented over three bit-value input pins. The instructions which are not assigned during the $2^3=8$ bit coding are not acceptable during the generation of instructions and are already excluded during the random generation for reasons of efficiency. The binary assignment of the instructions of the memory cell instruction space 1 is shown in FIG. 1.

In the tabular representation of the memory cell instruction space 1 shown in FIG. 1, in each case an instruction with the associated abbreviation of the instruction and with the associated binary representation is contained in each line. Here, the binary representation is represented in the first column, the instruction in the second column and the abbreviation of the instruction in the third column.

The instruction "Activate" constitutes the first instruction of the memory cell instruction space 1. The binary representation of the instruction "Activate" has the character sequence "000a". Here, the first three bits "000" stand for the bit combination of the instruction "Activate". The fourth bit "a" serves as an entry for the column address a with which the various memory cells are addressed. The abbreviation of the instruction "Activate" is "ACT(a)". The instruction "Activate" opens the access or the word line of a memory cell or the mapping of the memory module.

The second instruction of the memory cell instruction space 1 is the instruction "Read" with the abbreviation "RD" and with the binary representation "001X". The bit marked with X is irrelevant and is not processed. The instruction "Read" reads out data stored in the mapping of the memory module.

The next instruction of the memory cell instruction space 1 is given by the instruction "Write" with the abbreviation "WRI(d)" and with the binary representation "010d". Here, the character "d" stands for the input data item which is written into the respective memory cell of the memory module. The instruction "Write" writes data into the mapping of the memory module.

The next instruction of the memory cell instruction space 1 is provided as the instruction "Deactivate (Precharge)" with the abbreviation "PRE" and with the binary representation "011X". The access or the word line of a memory cell of the mapping of the memory module is closed with the "Deactivate" instruction.

The last acceptable instruction of the memory cell instruction space 1 is the instruction "No Operation" with the abbreviation "NOP" and with the binary representation "100X".

The binary representations "101X", "110X" and "111X" are detected as unacceptable by the mapping of the memory module and not processed.

FIG. 2 shows a memory cell state model 2 of the mapping of the memory module which has the memory cell instruction space 1 shown in FIG. 1, with a memory access closed state 3 and with a memory access open state 4, according to an exemplary embodiment.

In the method according to the invention for testing a mapping of an electrical circuit, a reference model is accessed which is embodied as a memory cell state model 2 in the present exemplary embodiment. The reference model generally has a plurality of states with a plurality of state transitions. In each case a subsequent state and the corresponding output data can be determined from this reference model for each state as a function of input data which is present as instructions or as input vectors.

The memory module which is considered here with two memory cells correspondingly has four-value memory information and two-value addressing. The memory module can be in precisely one of the two states memory access closed state 3 or memory access open state 4.

In the exemplary embodiment, the input data is provided by an input vector. This input vector has an instruction of the memory cell instruction space 1 shown in FIG. 1, or such an instruction in conjunction with a further value.

This further value is detected by the instruction "Activate" as the address of the word line or memory cell to be activated. The instruction "Write" uses this value for storage in the respectively selected memory cell.

In the memory access closed state 3, the instruction "No Operation" is permitted, and leads to a state transition into the same state. The instruction "Activate" brings about a state transition into the memory access open state 4.

The memory state closed state 3 is reached from the memory access open state 4 by means of the instruction "Deactivate". In the memory access closed state 3, neither a writing access by means of the instruction "Write" nor a reading access by means of the instruction "Read" nor the instruction "Deactivate" is possible.

In the memory access open state 4, the respectively activated memory cell of the memory module can be read out by means of the command "Read" and written to by means of the command "Write". Furthermore, the command "No Operation" is permitted. The same subsequent state is reached from the memory access open state 4 by means of the commands "Read", "Write" and "No Operation". A state transition into the next memory access closed state 3 takes place by means of the instruction "Deactivate".

The memory access open state 4 is reached by executing the instruction "Activate" from the memory access closed state 3. The execution of the instruction "Activate" is not acceptable in the memory access open state 4.

The memory access closed state 3 and the memory access open state 4 are represented in FIG. 2 by means of ellipsoidal symbols, and the described state transitions by means of arrows. State transitions not shown in FIG. 2 are unacceptable.

State transitions from one state into the subsequent state last for one "Clock Cycle" and one time step. While the instruction, the input data and the address of the memory cell are present at the current time step, the output data item is not expected until one time step later. The memory module cannot thus be checked for a valid output data item until the following time step. This is relevant in particular for the instruction "Read". The data which is read out of a memory cell is not available until the directly following time step.

The address of the respectively opened cell of the memory module is not explicitly taken into account in the memory cell state model 3 shown in FIG. 2. It is in fact not relevant for evaluating the acceptability of an input vector in the present exemplary embodiment.

Figure 3:
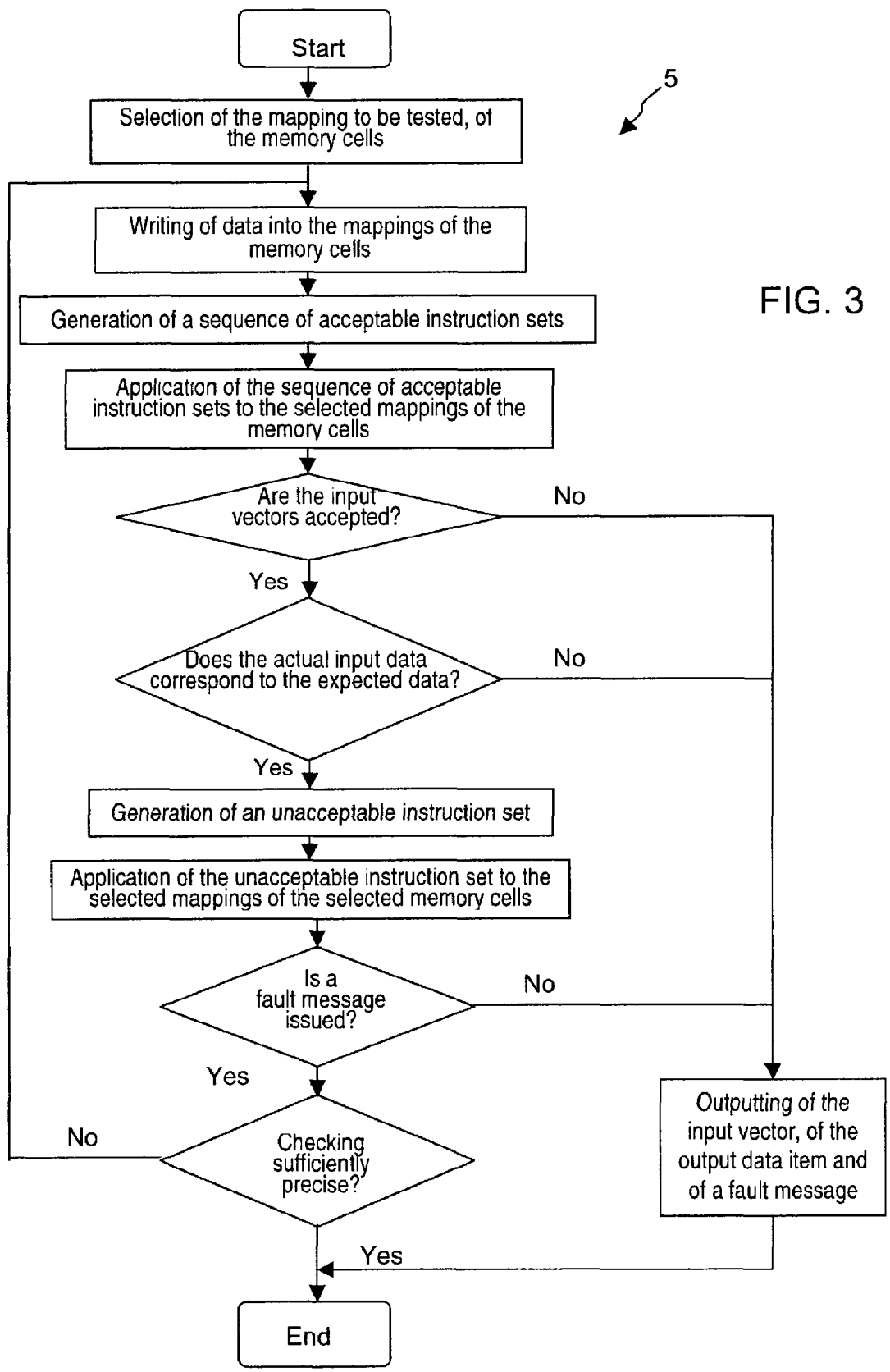
FIG. 3 is a flowchart of the method for testing the mapping of the memory module, which has the memory cell instruction space (1) shown in FIG. 1 and the memory cell state model (2) shown in FIG. 2, according to an exemplary embodiment.

FIG. 3 shows a flowchart 5 of the method for testing the mapping of the memory module which has the memory cell instruction space 1 shown in FIG. 1 and the memory cell state model 2 shown in FIG. 2, according to an exemplary embodiment.

The sequence of the method according to the invention for testing a mapping of an electrical circuit can be represented graphically by means of a flowchart, by means of a structogram, by means of a Michael-Jackson diagram and by means of further diagrams.

In the graphic representation of the flowchart 5 which is selected here, the execution fields are represented as rectangles, the decision fields as rhombuses and the transitions between the method steps by arrows.

In the exemplary embodiment according to FIG. 3, the start field represents the start of the method according to the invention. When the method according to the invention starts, a mapping of the memory module to be tested is available on a computer system, and a reference model of this memory module and a generator for generating acceptable and unacceptable instruction sets are available for processing with the mapping of the memory module. Furthermore, initialization of the mapping of the memory module to be tested takes place in the start field.

Firstly, the mappings of the memory cells to be tested are selected. In the present exemplary embodiment, these are the memory cell with the address zero and the memory cell with the address one of the memory module.

In a subsequent step, initial data is written into these mappings of the memory cells. Then, the generator generates a sequence of acceptable instruction sets using the memory cell instruction space 1 and the memory cell state model 2. This sequence of acceptable instruction sets is applied to the selected mappings of the memory cells.

Then, it is checked whether the input vectors of the generated acceptable instruction sets are accepted by the mapping of the memory module. If this is not the case, the respective input vector, the associated output data item and a fault message are output. The method according to the invention stops at this point.

If the input vectors, generated using the memory cell state model 2, of the acceptable instruction sets are accepted by the mapping of the memory module, the method according to the invention checks, in a subsequent step, whether the output data generated by the mapping of the memory module corresponds to the output data determined using the memory cell state model 2.

If this is not the case, the respective output data item, the associated input vector and a fault message are output. In this case, the method according to the invention is terminated here.

If the output data generated by the mapping of the memory module corresponds to the expected output data, the method continues with the generation of an unacceptable instruction set. Here, the memory cell instruction space 1 and the memory cell state model 2 are used. The unacceptable instruction set generated in this way is applied to the mapping of the memory module. Here, checking takes place to determine whether this unacceptable instruction set brings about a fault message when the memory module is mapped.

If this is not the case, the instruction set is output with a fault message. The method according to the invention is terminated at this point.

If a fault message is issued, in a subsequent step it is determined whether the checking is sufficiently precise or whether the mapping of the memory module is to be checked by means of further instruction sets. Here, a user can predefine abort criteria with which the scope of the checking of the mapping of the memory module is determined by means of the method according to the invention.

If it is determined at this point that the checking of the mapping of the memory module is sufficiently precise, the method according to the invention is terminated.

If the checking of the memory module is not yet sufficiently precise, there is successive repetition of the method steps starting with the writing of data into the mapping of the memory module.

The end field indicates that the method for testing the mapping of the memory module is terminated. Furthermore, by means of the presence of a fault message it is possible to determine whether the mapping of the memory module has a fault. If a fault message is present, the input vector and the output data item at which a fault in the mapping of the memory module was determined are apparent.

FIG. 4 shows a memory cell test pattern 6 of the mapping of the memory module which has the memory cell instruction space 1 shown in FIG. 1 and the memory cell state model 2 shown in FIG. 2, according to an exemplary embodiment, said memory cell test pattern 6 being generated in accordance with the flowchart 5 shown in FIG. 3.

The memory cell test pattern 6 is illustrated in table form in FIG. 4. Each row of the memory cell test pattern 6 corresponds to a time step at which in each case an input vector is applied to the mapping of the memory module, and an output data item is generated.

The first column of the memory cell test pattern contains the time steps of the mapping of the memory module, rising numerically.

The second column contains the respective input vector. Here, for reasons of better clarity, the textual description is selected. For example, the input vector "ACT(0)" stands for the input vector "0001". This input vector is generated according to the invention on the basis of random numbers by means of a generator. Here, unacceptable instruction sets are generated during the method only if the generation of an unacceptable instruction set is provided in the method. Otherwise, unacceptable instruction sets are excluded from the outset.

The output data item is given in the third column of the memory cell test pattern 6. The output data item is generated from the input vector of the respective preceding time step by means of the mapping of the memory module. The output data item may assume the binary values 0 or 1 and the symbol "X". The symbol "X" is used if no output data item is expected, in particular as a consequence of a previously executed "Read" instruction.

In the fourth column of the memory cell test pattern there is in each case a comment on the input vector and on the output data item of the respective time step.

The memory cell test pattern 6 is based on the memory access closed state 3. The mappings of the memory cells which are to be tested are the mapping of the first memory cell and the mapping of the second memory cell of the memory module according to the exemplary embodiment.

The two mappings of the memory cells each have the value "1" written to them in the time steps "1" to "6" of the memory cell test pattern 6. Here, the word line of the respective memory cell is opened in succession for both memory cells, the input data item "0" is written into them and then the word line "0" and "1" is closed. Here, the first memory cell of the memory module is addressed with the value "0", and the second memory cell is addressed with the value "1".

In the time steps "7" to "13" of the memory cell test pattern 6, a sequence of acceptable instruction sets is generated and applied to the mapping of the two memory cells. Here, in time step "7", the word line "0" is opened, in time step "8" the input data item "0" is written into the first memory cell, in time step "9" the No Operation is carried out and in time step "10" the output data item is read. The output data item appears in the next time step, specifically the time step "11". In the time step "11", the input data item "1" is written into the first memory cell and the output data item is tested with respect to the previous input vector "0". In the time step "12", the word line "0" is closed, and in time step "13" the word line "1" of the second memory cell is opened.

The checking of the input vectors and the checking of the output data of the time steps "7" to "13" each yield a positive result.

An unacceptable input vector is then generated on the basis of the memory access open state 4 which is present before the time step "14", using the generator to generate input vectors. Here, the generator excludes all the acceptable instructions "Read", "Write", "No Operation", "Deactivate". An unacceptable instruction is extracted from the remaining unacceptable instructions in accordance with a random distribution.

The present case is concerned with the input vector "ACT(0)", specifically with the activation of the first memory cell on the basis of the memory access open state 4.

The unacceptable input vector "ACT(0)" generated in this way is then applied to the mapping of the memory module. Given correct functioning, the mapping of the memory module then gives rise to a fault message which, in the present exemplary embodiment, points to the fact that it is not acceptable to open an open memory cell once more.

If the mapping of the memory module provides a fault message which is expected by the reference model, the method according to the invention is continued with the step of the writing of data into the mappings of the memory cells.

If a fault message fails to occur as a result of the mapping of the memory module, a find has been made with the method: the mapping of the memory module does not filter out an unacceptable instruction set, and is therefore faulty and must be corrected.

The sequencing of the method steps of the writing of the mapping of the memory module, the generation, creation and checking of acceptable input vectors, the generation, creation and checking of unacceptable input vectors is repeated as often as desired until there is a sufficiently high probability that each unacceptable input vector is detected by the mapping of the memory module.

I claim:

1. A method of testing a mapping, present on a computer system, of an electrical circuit that is actuatable with instruction sets, wherein:

the electrical circuit has a closed instruction space and a plurality of memory cells, and the circuit is described by a reference model having a plurality of states and a plurality of state transitions;

at least one of an acceptable instruction set for each state and an unacceptable instruction set for each state is predefined, an instruction set having an input vector and an output data item, whereby for each input vector of an instruction set there is reached, starting from a respectively present state, a subsequent state and an output data item is generated;

the mapping of the electrical circuit is configured, upon receiving an acceptable instruction set as a data input, to allow a state transition into a subsequent state of the mapping and to output the generated output data item, and, upon receiving an unacceptable instruction set as a data input, to issue a fault message;

the states and the state transitions of the mapping corresponding to the states and the state transitions of the reference model; and instruction sets are generated with specific probabilities and applied to the mapping of the electrical circuit, the instruction sets being either acceptable instruction sets or unacceptable instruction sets, an unacceptable instruction set having a combination of input signals, being not related to an instruction, or having commands being applied at a time, at which the commands are not allowed;

the method which comprises the following steps:

a) initializing the mapping of the electrical circuit to be tested;

b) selecting a region of the mapping of the electrical circuit to be tested;

c) writing initial data into the mappings of the memory cells of the region selected in step b);

d) generating a sequence of acceptable instruction sets using the reference model;

e) applying the instruction sets generated in step d) as an input vector for the mapping to test the region of the mapping selected in step b);

f) generating an unacceptable instruction set using the reference model;

g) applying the unacceptable instruction set as an input vector for the mapping to test the region of the mapping selected in step b);

h) checking whether the mapping of the electrical circuit supplies a fault message;

i) repeating steps f) to h) for further unacceptable instruction sets;

j) repeating steps c) to i) until sufficient precision of the testing is achieved; and k) repeating steps b) to j) for further regions of the mapping of the electrical circuit to be tested.

2. The method according to claim 1, which comprises performing the following steps subsequently to step e):

e1) checking whether the input vectors of the instruction sets are accepted by the mapping of the electrical circuit;

e2) checking whether the output data supplied by the mapping of the electrical circuit corresponds to the output data of the instruction sets generated in step d).

3. The method according to claim 2, which comprises, if one of the checking steps e1), e2), and h) yields a negative result, selecting at least one of the following steps: outputting the current input vector and the current output data item with a fault message, and terminating the method.

4. The method according to claim 1, which comprises defining the mapping of the electrical circuit with a time profile having equidistant, discrete time steps, and wherein in each case an input vector is applied to the mapping of the electrical circuit at each time step, and the output data item which is determined from the input vector and from the state in which the input vector is applied, and the subsequent state, is present in the respective next time step.

5. The method according to claim 1, which comprises defining each input vector to have, in each case, an instruction from the closed instruction space or an instruction from the closed instruction space and an input value.

6. The method according to claim 1, which comprises defining each output data item to have, in each case, an output value or a variable indicating that no output value is available.

7. The method according to claim 1, which comprises generating the instruction sets with an instruction set generator.

8. The method according to claim 1, which comprises generating the instruction sets with a random-number-based computer program for execution on a computer system.

9. A computer program product, comprising a computer program with computer-executable instructions for executing the method according to claim 1.

10. A computer program, comprising a set of computer-executable instructions contained on a computer-readable medium and enabled to perform the method according to claim 1.

11. The computer program according to claim 10, wherein said computer-readable medium is selected from the group consisting of a computer memory, a computer storage device, a direct access memory, and a transmitting electrical carrier signal.

12. A data carrier, comprising a computer program with instructions to perform the method according to claim 1.

13. A data carrier, comprising a computer program product with instructions to perform the method according to claim 1.

14. A computer-related method, which comprises downloading a computer program product or computer program containing computer-executable instructions for performing the method according to claim 1 from an electrical data network onto a computer connected to the data network.

15. The computer-related method according to claim 14, wherein the electrical data network is the Internet.

16. The computer-related method according to claim 14, which further comprises running the computer program on the computer connected to the data network to thereby test a mapping of a given electrical circuit.

* * * * *